(No Model.) 2 Sheets—Sheet 2.

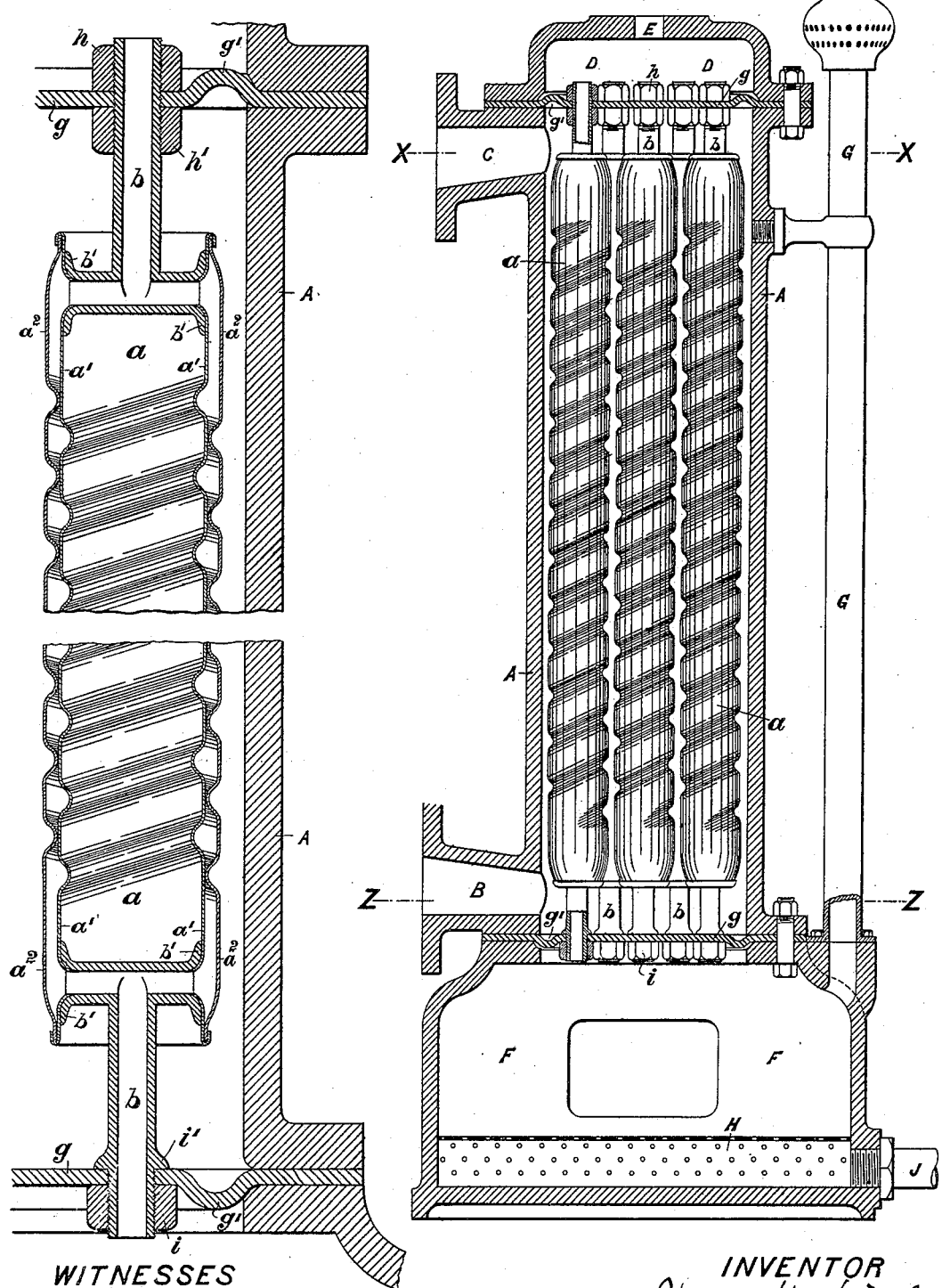

H. HOCKING.
APPARATUS FOR CONDENSING AND COOLING.

No. 342,871. Patented June 1, 1886.

WITNESSES

INVENTOR
Henry Hocking By

United States Patent Office.

HENRY HOCKING, OF LIVERPOOL, COUNTY OF LANCASTER, ENGLAND.

APPARATUS FOR CONDENSING AND COOLING.

SPECIFICATION forming part of Letters Patent No. 342,871, dated June 1, 1886.

Application filed May 29, 1885. Serial No. 167,069. (No model.) Patented in England July 11, 1884, No. 10,044; in France December 22, 1884, No. 166,062, and in Germany January 11, 1885, No. 31,764.

*To all whom it may concern:*

Be it known that I, HENRY HOCKING, a subject of the Queen of Great Britain, and a resident of the city of Liverpool, in the county of Lancaster, in that part of the United Kingdom of Great Britain and Ireland called England, engineer, have invented certain new and useful Improvements in Apparatus for Condensing and Cooling; and I do hereby declare that the following is a full, clear, and exact description of my invention, sufficient to enable any one skilled in the art to which it belongs or with which it is most nearly connected to make and put the same into practice, reference being had to the accompanying sheets of drawings, and to the letters and figures of reference marked thereon, like letters and figures being used to denote the same or corresponding parts throughout the drawings.

Figure 3:
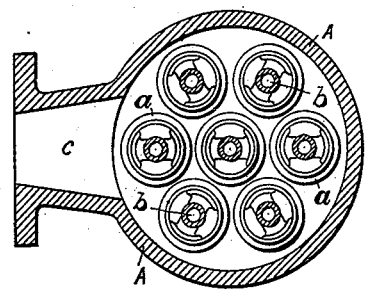
Figure 4:
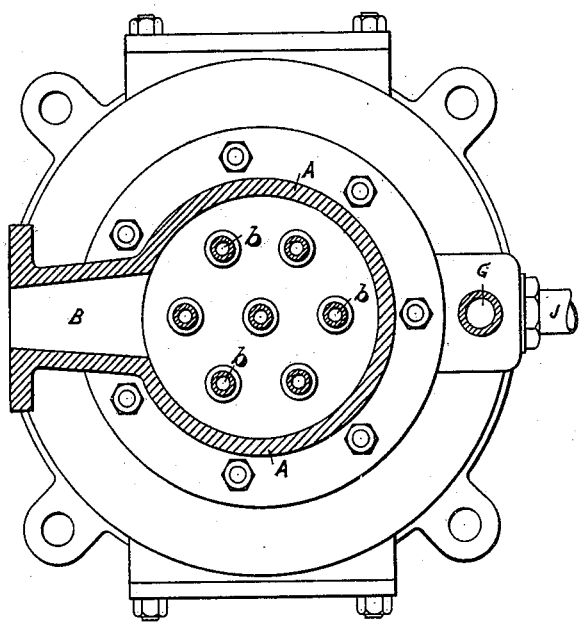

In the drawings, Figure 1 is an elevation, partly in section, of an apparatus for condensing and cooling constructed according to my invention. Fig. 2 is a sectional view of one of the tubes used in the apparatus shown at Fig. 1. Fig. 3 is a sectional plan taken at X X, Fig. 1. Fig. 4 is a sectional plan taken at Z Z, Fig. 1.

My invention relates to that class of condenser and cooler which is used in the production of fresh water by distillation, and especially for obtaining fresh water by the condensation of steam generated from salt-water, and has for its object the construction of an apparatus for condensing, in which the water (obtained by the condensation of the steam) is cooled in passing through the apparatus, also the obtaining of a large cooling-surface and a simple arrangement and construction of parts, allowing the apparatus to be readily taken to pieces, and the construction providing for expansion and contraction of parts and interchangeability of tubes.

An apparatus constructed with my improvements applied thereto for condensing steam and cooling the condensed water as suitable for use on board ship for obtaining fresh water from salt-water, consists of the following parts: $a$ are condensing and cooling tubes. $b$ are connecting-pipes, which are attached to the tubes $a$ by brazing or soldering. A is a water-circulating vessel provided with the passages B C, through which the condensing water circulates. $g$ are diaphragms. D is a steam-chest provided with the entrance-passage E. F is a filter-box; G, an aerating-pipe. H is a strainer. J is an outlet for the condensed water.

The condensing-tubes are constructed of two cylinders, $a'$ $a^2$, (see Fig. 2,) which are provided with spiral indentations running in opposite directions. The cylinders are placed one within the other in such a manner that the spiral indentations cross one another, and so form cross ways or passages. The ends of the cylinders $a'$ $a^2$ are closed by turning the end of one of the cylinders over the end of the other, the communications to the interior of the tubes being made through the inside cylinder, $a'$, to which the connecting-pipes $b$ are attached. The pipes $b$ are provided with the flanges $b'$, to which the cylinders $a'$ are brazed or soldered. This method of closing the ends of the tubes $a$ and attaching the pipes $b$ to them effects an efficient security against leakage, even at high pressures.

The diaphragms $g$, to which the stems of the pipes $b$ are fastened, are corrugated at $g'$, so as to allow of a certain amount of elasticity in them to permit of expansion or contraction of the tubes $a$ or the vessel A, and other small inequalities that may occur in the length of the tube $a$ and pipes $b$. The ends of the pipes $b$ are screw-threaded, which screw-threaded portions take the nuts $h$ $h'$, and between which comes the diaphragm $g$. To the lower diaphragm the tubes $b$ are attached by means of the nut $i$ and collar $i'$.

In operation, cold water is caused to circulate through the water-vessel A and around the inner and outer surfaces of the tubes, and the steam to be condensed is led from any suitable generator through the inlet E to the steam-chest D, from whence it passes through the top pipes, $b$, into the tubes $a$, in which the steam is condensed in passing through the upper portion of the spiral ways, and the water resulting from such condensation is cooled in passing through the other and lower portion of the spiral ways, and finally passes through the lower tubes, $b$, into the filter-box F, from whence it is drawn for use through the pipe J. The steam and condensed water by passing in a stream or crossed streams through the spiral ways in the tubes $a$ is subjected to a prolonged contact with the surface of the ways $a$, cooled by the circulating water.

Referring to Fig. 2, the pipe $b$ terminates at its lower end in a T-branch, the two mouths of which are fitted to and open through orifices in the tube $a'$ into the spiral steam-passages between the corrugated tubes $a^2$ and $a'$. The inner corrugated tube, $a'$, extends up above the outer corrugated tube, $a^2$, and is bent outward and around the upper end of the tube $a^2$ and brazed or soldered thereto, forming a tight joint. The inner tubes, $a'$, are open-ended. (See Fig. 3.) The water which enters through the passage C and leaves the chest through B circulates around the outer side of the corrugated tubes $a^2$ and through the inside of the corrugated tube $a'$, the water entering and leaving the last-named tubes through the spaces left on both sides of the T-branch of the pipe $b$. (See Fig. 3.)

Having now described my improvements, I claim as my invention, and desire to secure by Letters Patent, the following:

1. In an apparatus for cooling, the combination of a spirally-corrugated inclosing-tube and a spirally-corrugated internal tube, said spiral corrugations intersecting each other at an angle to form a system of separate ways, through which the agent to be cooled circulates, substantially as described.

2. In an apparatus for cooling, a plurality of spiral ways intersecting each other at an angle, forming separate intersecting paths, communicating with each other at the points of intersection, through which the agent to be cooled passes, substantially as described.

3. In an apparatus for cooling, the combination of a spirally-corrugated inclosing-tube and a spirally-corrugated internal tube, said spiral corrugations on the said tubes intersecting each other at an angle, the sides of one of said tubes being folded over and around the end of the other tube, substantially as described.

4. In an apparatus for condensing and cooling, a casing through which the cooling agent passes, combined with a corrugated diaphragm, $g$, and a group of tubes through which the agent to be cooled circulates, said tubes being severally formed of a spirally-corrugated internal tube and a spirally-corrugated external tube, said spiral corrugations intersecting each other at an angle, and connecting-pipes $b$, substantially as described.

HENRY HOCKING.

Witnesses:
   FREDERICK JOHN CHEESBROUGH,
   ERNEST R. ROYSTON,
*Both of* 15 *Water Street, Liverpool, England.*